Aug. 11, 1959 W. A. ARDITO 2,899,215
VACUUM CLEANER COUPLING WITH EXPANDABLE RING LOCKING MEANS
Filed May 6, 1955 2 Sheets-Sheet 1

INVENTOR
WILLIAM A. ARDITO
BY *R. J. Eisinger*
ATTORNEY

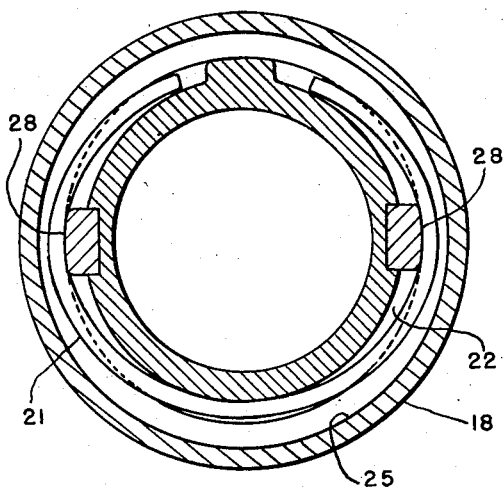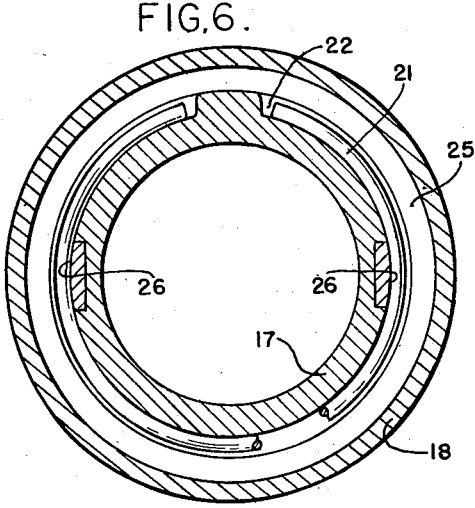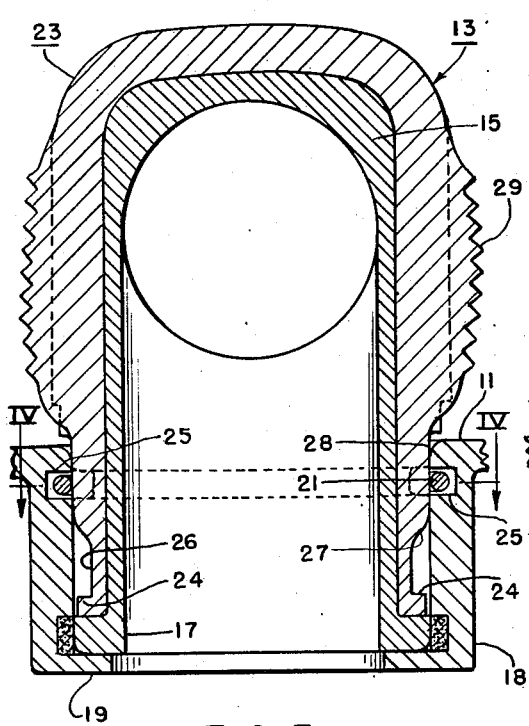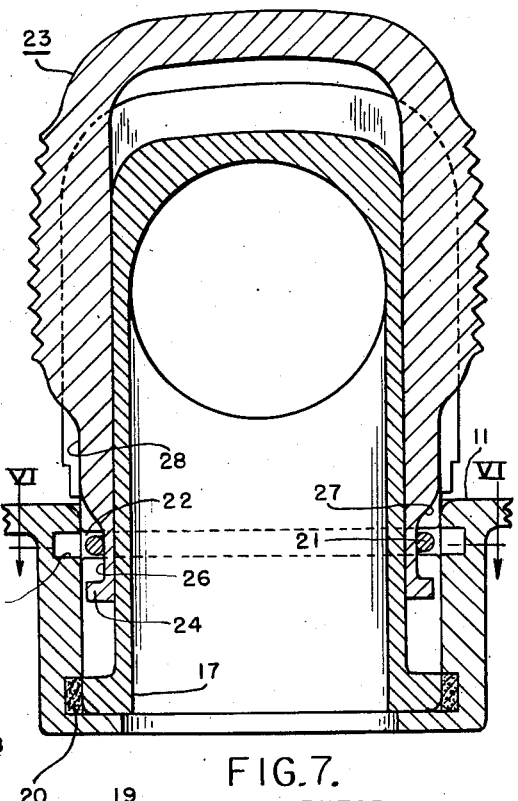

2,899,215

VACUUM CLEANER COUPLING WITH EXPANDABLE RING LOCKING MEANS

William A. Ardito, West Springfield, Mass., assignor to Westinghouse Electric Corporation, East Pittsburgh, Pa., a corporation of Pennsylvania Application May 6, 1955, Serial No. 506,517

3 Claims. (Cl. 285—7)

My invention relates to suction cleaning apparatus, more particularly to a swivel elbow hose connector, or detachable coupling.

In one type of suction cleaner, a flexible hose is connected to an opening in the top of the cleaner body by means of an elbow connector, so that the hose extends horizontally therefrom. It is also desirable that the connector be adapted to swivel or rotate about the vertical axis of the opening and that it be readily detachable.

It is an object of my invention to provide an improved connector of the type set forth.

A more particular object is to provide a connector that may be readily locked or unlocked by movement in the direction in which the connector is moved toward or away from the opening.

These and other objects are effected by my invention as will be apparent from the following description taken in connection with the accompanying drawings, forming a part of this application, in which:

Fig. 4 is a horizontal section, taken on the line IV—IV of Fig. 5;

Fig. 5 is a vertical section, taken on the line V—V of Fig. 3, showing the connector in locked position;

Fig. 6 is a horizontal section taken on the line VI—VI of Fig. 7;

Fig. 7 is a vertical section showing the connector unlocked from, but not yet removed from, the cleaner body.

Figure 1:
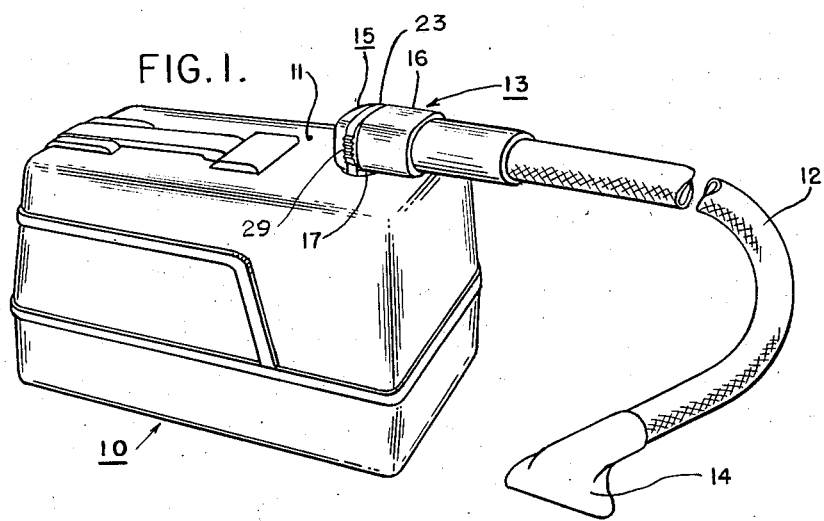
Fig. 1 is a perspective view of a suction cleaner body and a flexible hose connected thereto by my novel connector.
Figure 2:
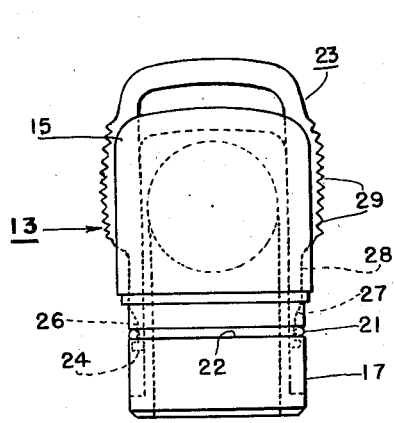
Fig. 2 is an end elevation of the connector.
Figure 3:
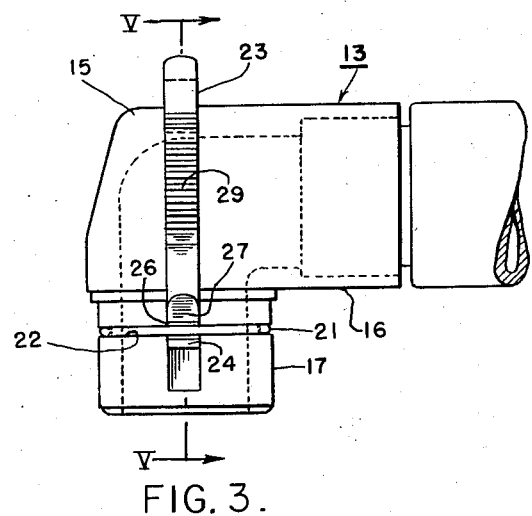
Fig. 3 is a side elevation thereof.

Referring to the drawings in detail, I show a cleaner body 10 containing the usual suction fan, motor and dust bag, which may be of conventional construction so far as the present invention is concerned and, therefore, are not illustrated. The body is provided with an inlet or suction opening in its top wall 11, and a flexible hose 12 is connected to the opening by means of my novel swivel elbow hose connector 13. An ordinary cleaning nozzle 14 is provided on the other or free end of the hose 12.

The connector 13 comprises an intermediate corner or elbow portion 15, a horizontally extending portion 16 to which the hose is connected, and a depending male portion 17 adapted to extend downwardly into the suction opening. The top wall 11 has a depending tubular, or female, portion 18, which surrounds the inlet opening, into which the depending portion 17 fits and it has a flange 19 to limit the downward movement of the portion 17. A felt seal 20 may be provided to minimize leakage of air between the depending portions 17 and 18.

The connector further comprises a locking spring ring 21, received and retained in an annular groove 22 in the outer surface of the depending portion 17. It further comprises a locking cam, or actuator, 23 of inverted U-shape, which is received and retained in vertical grooves in the outer surface of the elbow and depending portions 15 and 17. The side arms of the locking cam extend under the spring locking ring 21, as shown in Figs. 5 and 7, and have projections 24 at their lower ends to limit upward movement by abutment with the ring 21, as shown in Fig. 7. The top wall 11 is formed with an annular groove 25 in the inlet opening, disposed so that the grooves 22 and 25 are in alignment or registry with each other when the depending portion of the connector is inserted in the inlet opening as shown in Figs. 5 and 7.

Each of the side arms of the locking cam has a low cam surface 26, a sloping cam surface 27, and a high cam surface 28, which will be further described in connection with the operation of the invention. Each arm is also formed with a projecting portion 29, which may be knurled, whereby the locking cam may be readily engaged by the fingers to be actuated.

*Operation*

When the hose is detached from the cleaner body, the locking cam is ordinarily in the raised position, as shown in Fig. 7. The low surfaces 26 are at the groove 22, and as these surfaces register with the bottom of the groove, the spring ring 21 is contained entirely within the groove and does not project therefrom. Therefore, the depending portion 17 of the connector may be inserted in the inlet opening. This downward movement is preferably and naturally effected by placing the thumb and forefinger on the side arms of the locking cam. When the depending portion 17 abuts the flange 19, at which time the groove 22 registers with the groove 25, further movement of the connector body stops, but downward movement of the locking cam 23 continues until its cross arm at the top abuts the top of the connector body. As the locking cam moves downwardly relative the connector body, the low cam surfaces 26 are moved down below the ring 21. As the sloping cam surfaces 27 move downwardly, they force the adjacent portions of the ring 21 outwardly into the groove 25 in the top wall. The intermediate portions of the ring remain in the groove 22, preventing movement of the ring lengthwise of connector portion 17, and the ring assumes an oval shape as shown in Fig. 4. Thus, the connector is locked to the top wall 11, but is free to rotate or swivel relative thereto in either direction without limit, since the ring can rotate freely in the groove 25.

To detach the connector, one merely engages the side arms of the locking cam 23 and moves them upwardly. The cam surfaces 27 and 28 move upwardly out of the way of the ring 21 and the low surface 26 moves adjacent the ring, permitting it by its own resilience to retract into the groove 22. The projections 24 then engage the spring ring 21 and thereby move the connector upwardly out of the inlet opening.

It will thus be seen that the connector is locked and unlocked by movement in the same direction in which the connector is moved to and away from connected position; in fact, it may be moved by the same manual movement by which the connector is moved. While the ring 21 and the groove 22 are referred to as being annular, their circular extent is preferably slightly less than the complete circle, as shown on the drawing, in order that the ends of the ring may abut the ends of the groove to limit the rotation of the ring in the groove.

While the invention has been shown in but one form, it will be obvious to those skilled in the art that it is not so limited, but is susceptible of various other changes and modifications without departing from the spirit thereof.

What is claimed is:

1. A detachable coupling comprising an elbow shaped member having a convex circular surface and a cooperating member having a concave circular surface, said convex surface being adapted to be inserted in said concave surface, means to limit the extent of insertion, said surfaces having substantially annular grooves which register at maximum insertion, a spring locking ring normally disposed entirely within the groove in the convex surface, a locking cam of inverted U-shape having side arms, said elbow shaped member having grooves parallel to the axis of said convex circular surface, said side arms being received in said parallel grooves and extending under said spring ring and having low, high and sloping surfaces adapted to be moved adjacent said ring and disposed so that as the locking cam is moved in the direction of insertion the sloping surfaces move adjacent portions of the ring outwardly into the groove in the concave surface and then the high surfaces retain them there, and so that as the locking cam is moved in the direction of separating the coupled members, the high and sloping surfaces move out of the way and the low surface permits the ring to be retracted into the groove in the convex surface, whereby the members are locked by movement of the cam in the direction of insertion and are unlocked by movement of the cam in the direction of separation.

2. A detachable coupling comprising a tubular female member provided with an annular groove in the inner surface thereof, an elbow-shaped member having an elongated male portion receivable within said female member, said male portion having a spring locking ring which substantially encompasses said male portion and is expansible into said groove when said male portion is received in said female member, means for preventing movement of said ring lengthwise of said male portion, a U-shaped actuator including side arms which extend lengthwise of said male portion, and a cross arm extending around the lebow of said elbow-shaped member and connecting said side arms, said side arms being astride said male portion and in engagement with said ring, said male portion being provided with means for guiding the movement of said actuator in a direction lengthwise of said male portion, said side arms having cam means thereon engageable with said ring for expanding the ring outwardly into said groove so as to lock said female member and said elbow-shaped member when said actuator is moved in the direction of insertion of said male portion and for releasing said ring to permit retraction of the ring from said groove so as to unlock said female member and said elbow-shaped member when said actuator is moved in the direction of removal of said male portion from said female member.

3. A detachable coupling comprising a tubular female member provided with an annular groove in the inner surface thereof, an elbow-shaped connector having an elongated male portion receivable within said female member, a spring locking ring carried by the male portion of said connector and being movable outwardly of said male portion into said groove for locking said connector to said female member, means for preventing movement of said ring lengthwise of said male portion, said connector being provided with a generally U-shaped groove having guide regions disposed on opposite sides of said male portion and extending lengthwise of said male portion and a connecting region extending around the elbow of said connector, a U-shaped actuator having side arms disposed within the guide regions of said connector groove and a cross arm connecting said side arms, and cam means on said actuator side arms and engageable with said ring for moving said ring into the groove in said female member when the cross arm of said actuator is moved into the connecting region of said connector groove and for releasing said ring to permit retraction of said ring when said cross arm is withdrawn from the connecting region of said groove.

References Cited in the file of this patent

UNITED STATES PATENTS

| | | |
|---|---|---|
| 19,852 | Hudgin | Apr. 6, 1858 |
| 448,694 | Tinsley | Mar. 24, 1891 |
| 1,096,690 | Derbyshire | May 12, 1914 |
| 1,261,687 | Brandon | Apr. 2, 1918 |
| 1,464,386 | Ingram | Aug. 7, 1923 |
| 1,734,236 | Smith | Nov. 5, 1929 |
| 2,598,758 | Bryam | June 3, 1932 |
| 2,021,241 | Mall | Nov. 19, 1935 |
| 2,040,155 | Shoemaker | May 12, 1936 |
| 2,069,377 | Matthiessen | Feb. 2, 1937 |
| 2,363,436 | Pancoe | Nov. 21, 1944 |
| 2,479,960 | Osborn | Aug. 23, 1949 |

FOREIGN PATENTS

| | | |
|---|---|---|
| 555,374 | Great Britain | Aug. 19, 1943 |